United States Patent
Kobyakov et al.

(10) Patent No.: US 9,047,627 B1
(45) Date of Patent: Jun. 2, 2015

(54) PUBLISHER SIDE FILE SUPPORT FOR EXPANDABLE CONTENT ITEMS

(71) Applicant: Google Inc., Mountain View, CA (US)

(72) Inventors: Pavel Kobyakov, Waterloo (CA); Ksenia Shubina, Vaughan (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/183,713

(22) Filed: Feb. 19, 2014

Related U.S. Application Data

(63) Continuation of application No. 13/466,618, filed on May 8, 2012, now Pat. No. 8,694,378.

(51) Int. Cl.
*G06Q 30/00* (2012.01)
*G06Q 30/02* (2012.01)

(52) U.S. Cl.
CPC ........ *G06Q 30/0277* (2013.01); *G06Q 30/0275* (2013.01); *G06Q 30/0257* (2013.01); *G06Q 30/0251* (2013.01)

(58) Field of Classification Search
CPC ................. G06Q 30/0257; G06Q 30/0275
USPC ............................................. 705/14.55, 14.71
See application file for complete search history.

(56) References Cited

U.S. PATENT DOCUMENTS

| | | |
|---|---|---|
| 6,615,251 B1 | 9/2003 | Klug |
| 6,973,436 B1 | 12/2005 | Shkedi |
| 7,610,560 B2 | 10/2009 | Horvitz et al. |
| 7,746,343 B1 | 6/2010 | Charaniya et al. |
| 8,237,937 B2 | 8/2012 | Sugiyama |
| 8,350,849 B1 | 1/2013 | Jones et al. |
| 8,352,539 B2 | 1/2013 | Mizuno |
| 8,462,949 B2 | 6/2013 | Anderson et al. |
| 8,510,167 B2 | 8/2013 | Lisbakken |
| 8,578,057 B2 | 11/2013 | Omar |
| 8,606,723 B2 | 12/2013 | Seubert et al. |
| 8,694,632 B1 | 4/2014 | Shubina et al. |
| 8,751,304 B1 | 6/2014 | Kobyakov et al. |
| 2002/0042786 A1 | 4/2002 | Scarborough |
| 2002/0046199 A1 | 4/2002 | Scarborough |
| 2002/0152305 A1 | 10/2002 | Jackson |
| 2002/0169803 A1 | 11/2002 | Sampath et al. |

(Continued)

FOREIGN PATENT DOCUMENTS

WO      WO0019332 A9    10/2001

OTHER PUBLICATIONS

Peters, 'Iframe loading techniques and performance', aaronpeters.nl, Dec. 20, 2010, on line at aaronpeters.nl/blog/iframeloading-techniques-performance?%3E, 11 pages.

(Continued)

*Primary Examiner* — John G Weiss
*Assistant Examiner* — Scott C Anderson
(74) *Attorney, Agent, or Firm* — Fish & Richardson P.C.

(57) ABSTRACT

This specification describes methods, systems, and apparatus, including computer programs encoded on a computer-readable storage device, for precluding the serving of expandable content items from vendors for publisher hosts that do not support the particular vendors.

12 Claims, 6 Drawing Sheets

(56) References Cited

U.S. PATENT DOCUMENTS

| | | | |
|---|---|---|---|
| 2003/0137512 | A1 | 7/2003 | Hoehn et al. |
| 2003/0182394 | A1 | 9/2003 | Ryngler et al. |
| 2004/0193388 | A1 | 9/2004 | Outhred et al. |
| 2004/0205711 | A1 | 10/2004 | Ishimitsu et al. |
| 2006/0074730 | A1 | 4/2006 | Shukla et al. |
| 2007/0299857 | A1 | 12/2007 | Gwozdz |
| 2008/0288342 | A1 | 11/2008 | Ingleshwar |
| 2009/0040246 | A1 | 2/2009 | Miyasaka |
| 2009/0099901 | A1 | 4/2009 | Sah et al. |
| 2009/0299862 | A1 | 12/2009 | Fan |
| 2010/0082657 | A1 | 4/2010 | Paparizos et al. |
| 2010/0306249 | A1 | 12/2010 | Hill et al. |
| 2010/0313129 | A1 | 12/2010 | Hyman |
| 2011/0055685 | A1 | 3/2011 | Jaquish |
| 2011/0071818 | A1 | 3/2011 | Jiang |
| 2011/0153435 | A1 | 6/2011 | Pisaris-Henderson |
| 2011/0161990 | A1 | 6/2011 | Smith |
| 2012/0101907 | A1* | 4/2012 | Dodda .................. 705/14.73 |
| 2013/0238994 | A1 | 9/2013 | Yurasits |
| 2013/0275901 | A1 | 10/2013 | Saas et al. |
| 2013/0339896 | A1 | 12/2013 | Shadle et al. |
| 2014/0164923 | A1 | 6/2014 | Georgiev et al. |
| 2014/0164985 | A1 | 6/2014 | Pimmel et al. |
| 2014/0240293 | A1 | 8/2014 | McCaughan et al. |

OTHER PUBLICATIONS

Expanding Options in Expandable Ads; Jun. 4, 2009; Wegert, Tessa; ClickZ/Marketing News & Expert Advise; http://www.clickz.com/clickz/column/1699404/expanding-options-expandable-ads; Aug. 15, 2012; 3 pages.

Gilbert, David, "Set IFRAME height based on size of remotely loaded content", solidgone Blog, Mar. 13, 2010, XP055066250, Retrieved from the Internet: URL:http://solidgone.org/Set-Iframe-height-based-on-size-of-remotely-loaded-content [retrieved on Jun. 11, 2013 ], abstract, 10 pages.

How do iframe busters for expandable ads work?; javascript—How do iframe busters for expandable ads work?—Stack Overflow; http://stackoverflow.com/questions/5553469/how-do-iframe-busters-for-expandable-ads-work; Aug. 15, 2012; 3 pages.

Introducing expandable ads on AdSense sites—Inside AdSense; Inside AdSense Blog; http://adsense.blogspot.com/2009/03/introducing-expandable-ads-on-adsense.html; Aug. 14, 2012; Mar. 4, 2009; 8 pages.

Macro overview; dfp DoubleClick for Publishers; http://support.google.com/dfp_premium/bin/answer.py?hl=en&answer=1242718; Aug. 14, 2012; 7 pages.

* cited by examiner

US 9,047,627 B1

PUBLISHER SIDE FILE SUPPORT FOR EXPANDABLE CONTENT ITEMS

CROSS-REFERENCE TO RELATED APPLICATIONS

This is a continuation of U.S. application Ser. No. 13/466,618 filed May 8, 2012. All subject matter set forth in the above referenced application is hereby incorporated by reference into the present application as if fully set forth herein.

BACKGROUND

This specification relates to information presentation.

Sponsored content (e.g. advertisements, deals or special offers) can be provided over the Internet to various user devices. For example, a web page can include slots in which sponsored content can be presented. These slots can be defined in the web page or defined for presentation with a web page, for example, along with search results or other content. Sponsored content can also be delivered through dedicated web portals or applications executing on the user devices.

Some content items are expandable. For example, a content item can be initially presented in an unexpanded form as a 728×90 pixel graphical item. When a user selects or interacts with this content item, an expanded view of 728×270 pixels can be presented. The expandable content items can be processed on the user device in several different ways. For example, the resource served by a publisher may be configured to render the expandable content item within the same frame of the resource. Alternatively, the resource served by a publisher may be configured to render the expandable content item within one or more nested iFrames of the resource.

To facilitate the processing of expandable content items in particular types of content item slots, such as in the case of iFrames, a content item provider (such as, in the case of advertisements, a vendor that serves advertisements for advertisers) provides a "publisher side file" (PSF) for a publisher host. The PSF file stores instructions that are used to ensure proper rendering, expansion and contraction of the expandable content item. Often the vendor specifies a location on the publisher host for storing the file so that a user device can request the publisher side file from the host. For example, a specified location for a particular vendor Vendor1 may specify a directory entitled "Vendor1Path" at the root of a publisher webserver. Thus, the publisher side file V1PSF.html for Vendor1 for a host www.example1.com may be retrieved by the URL:

http://www.example1.com/Vendor1Path/V1PSF.html.

However, not all publishers may store a publisher side file for each specific vendor. For example, a particular publisher may never obtain a publisher side file, or the publisher may accidentally delete the publisher side file, or some other action or inaction may result in the publisher not having a publisher side file for a particular vendor. Thus, if the particular vendor serves an expandable content item for a particular content item environment that requires a publisher side file, and the publisher side file is not available at the publisher, the expandable content item will not be able to properly render.

SUMMARY

In general, one aspect of the subject matter described in this specification can be embodied in methods that include the actions of receiving content item requests for publisher hosts from user devices, each request specifying a publisher host, and for each request, determining whether the publisher host specifies a user process of a first type for processing content items at the user device; for each content item request for a publisher host that does not specify a user process of the first type, allowing expandable content items served by a set of first vendors to participate in a content item selection process to select a content item to fulfill the request; for each content item request for a publisher host that does specify a user process of the first type: determining a set of second vendors for the publisher host, each of the second vendors being a vendor for which the publisher host provides a publisher side file for the vendor, the publisher side file being a file that facilitates processing of an expandable content item served by the vendor in a resource served by the publisher host, and wherein the set of second vendors is selected from the set of first vendors, allowing expandable content items served only by the set of second vendors to participate in the content item selection process to select a content item to fulfill the request; for each content item request: receiving data indicating a selected expandable content item selected by the content items selection process, and providing response data in response to the content item request that causes the selected expandable content item to be served to the user device. Other embodiments of this aspect include corresponding systems, apparatus, and computer program products.

Particular embodiments of the subject matter described in this specification can be implemented so as to realize one or more of the following advantages. Expandable content items are filtered out of a selection process when the expandable content items are to be processed by a user process that requires publisher side file support, and the publisher does not provide the required publisher side file(s). The automatic filtering reduces the occurrences of non-expansion of expandable advertisements, which improves both the user experience and the advertiser experience. The process also reduces testing overhead to ensure compatibility between a publisher and expandable content items served from a variety of different vendors, which results in a commensurate reduction in overhead expenses. Additionally, the increase in advertiser satisfaction will result in an increase in expandable advertising campaigns and increased revenue for publishers.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
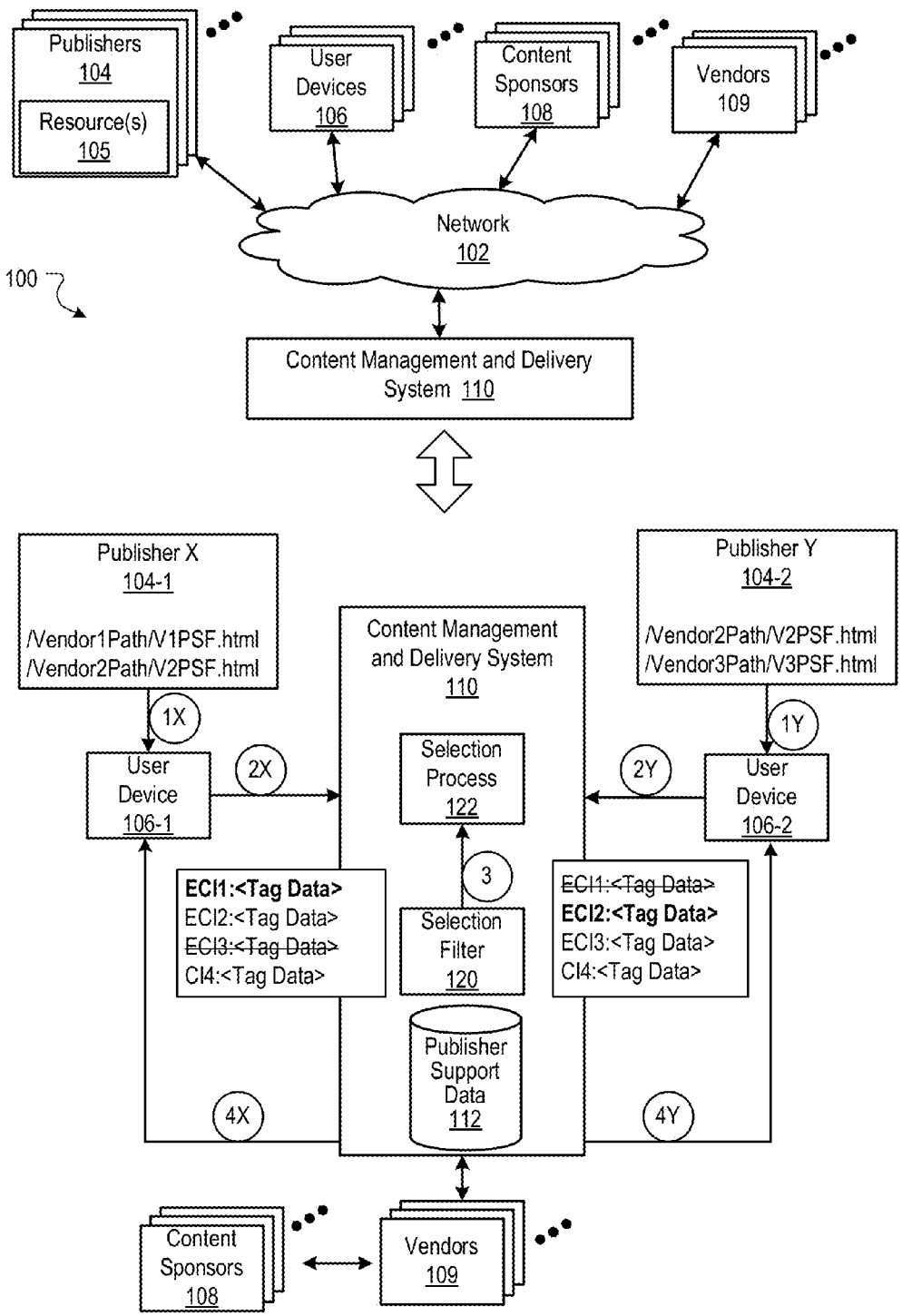
FIG. 1 is a block diagram of an example environment for delivering content.

The subject matter described in this document facilitates the preclusion of serving expandable content items by particular vendors for publishers that do not support the particular vendors. A content item management system, such as an advertising exchange in the case of advertisements, stores publisher support data that specifies, for each of multiple publisher hosts, whether the publisher host stores publisher side files for the vendor, and whether the publisher host specifies that expandable content items are to be processed according to a user process of a first type. The publisher host may specify that expandable content items are to be processed according to a user process of a first type either explicitly within the advertising request (e.g., the request includes data indicating the content item is to be rendered in an iFrame), or implicitly (e.g., the request does not include data indicating the content item is to be rendered in an iFrame, but the requested content item is for an iFrame environment). In the case of advertisements served over the exchange, a content sponsor is typically an advertiser that uses a vendor for serving advertisements through an exchange. Additionally, as used herein, a "user process of a first type" is a process that requires the presence and availability of a publisher side file.

The vendor provides technology for creating and serving the advertisements. The publisher authors or commissions the resource that is served and in which an advertisement can also be shown. The publisher can specify, by means of instructions in the resource, whether the advertisements are processed by a user process of a first type (e.g., processed within an iFrame) or by some other process, such as within the same frame of the resource. In the case of the former, a publisher side file for each particular vendor is necessary to properly process the expandable content item. When an expandable advertisement that is to be processed by the user process of the first type (e.g., within an iFrame) is served by a particular vendor, the advertising data that is served includes a location on the publisher server at which the publisher side file is stored. The location can be specified by the vendor or by the publisher. However, if the publisher side file is not stored at the publisher server, the expandable advertisement will not properly render.

To reduce the likelihood of improper rendering due to a lack of publisher side files, the advertising exchange, in some implementations determines for a content item request whether the publisher specifies a user process of a first type for processing content items at the user device. If the publisher does not specify a user process of the first type, then all content items are eligible to fulfill the request, as publisher side files are not required for the expandable content item to be processed.

However, if the publisher does specify a user process of the first type, vendors for which the publisher provides a publisher side files are selected. Then expandable content items for only those selected vendors are eligible to fulfill the request. This ensures that the publisher side file for a vendor will be available should an expandable content item be selected to fulfill the request.

To determine which publishers specify user processes of a first type, the content management system can, in some implementations, include instructions with the advertisement that is served, or, alternatively, include instructions in the content item tag code that is used to request the content item. The instructions cause the user device to send reporting data that specifies the user process type used to process the advertisement back to the content management system. The reporting data are stored in an association of publishers and user process types. Likewise, of those publishers that specify user processes of the first type, the content management system can determine which vendor(s) each publisher supports by, for example, crawling the publisher web servers and searching known publisher side file locations (either as specified by the vendor or by the publisher) to obtain the publisher side files, or by requesting data specifying publisher side files from the publishers. Data for each publisher that specifies the vendors that the publisher provides publisher side files is then stored at the content management system.

These features and other features are described in more detail below.

Example Environment

FIG. 1 is a block diagram of an example environment 100 for delivering content. The example environment 100 includes a content management and delivery system 110 for selecting and providing content to user devices. The example environment 100 includes a network 102, such as wide area network (WAN), the Internet, or a combination thereof. The network 102 connects publisher 104, user devices 106, content sponsors 108 (e.g., advertisers that use vendors to serve advertisements), vendors 109, and the content management and delivery system 110. The example environment 100 may include many thousands of publishers 104, user devices 106, content sponsors 108.

In some implementations, the content management and delivery system 110 includes a request handler that can receive a request for content from a user device, identify one or more eligible content items, and provide a content item responsive to the request.

A publisher 104 typically manages a website that includes one or more resources 105 associated with a domain name and hosted by one or more servers. An example website is a collection of web pages formatted in hypertext markup language (HTML) that can contain text, images, multimedia content, and programming elements, such as scripts. Each publisher 104 is an entity that controls, manages and/or owns the website.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts). In some implementations, the resources 105 can include sponsored content provided by the content sponsors 108 and that can be rendered in specific locations in the resource. For example, the resources 105 can include an advertisement, a deal or a special offer sponsored by a content sponsor 108.

A user device 106 is an electronic device that is under control of a user and is capable of requesting and receiving resources over the network 102. Example user devices 106 include personal computers, televisions with one or more processors embedded therein or coupled thereto, set top boxes, mobile communication devices (e.g., smartphones), tablet computers, e-readers, laptop computers, personal digital assistants (PDA), and other devices that can send and receive data over the network 102. A user device 106 typically includes one or more user applications, such as a web browser, to facilitate the sending and receiving of data over the network 102.

A user device 106 can request resources 105 from a publisher 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., content item slots, or, in the case of advertisement content items, advertisement slots). The slots may be implemented as part of the resource or within, for example, an iFrame.

When a resource 105 is requested by a user device 106 and the resource includes a content item slot in which a content item of a sponsor is to be rendered, the content management system 110 receives a request for a content item. The request for the content item can include characteristics of the slots that are defined for the requested resource.

The content management and delivery system 110 can select from the eligible content items that are to be provided to the user device 106 based at least in part, for example, on results of an auction (or by some other content item selection process). For example, for the eligible content items, the content management and delivery system 110 can receive offers from content sponsors 108 and allocate or prioritize delivery of the content items, based at least in part on the received offers (e.g., based on the highest bidders at the conclusion of the auction or based on other criteria, such as those related to satisfying open reservations).

For situations in which the systems discussed here collect personal information about users, the users may be provided with an opportunity to opt in/out of programs or features that may collect personal information (e.g., information about a user's social network, social actions or activities, profession, a user's preferences, or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. In some implementations, users can opt out of being characterized or targeted for content, including advertisements, based on the interest profiles for which they may be characterized.

Figure 2A:
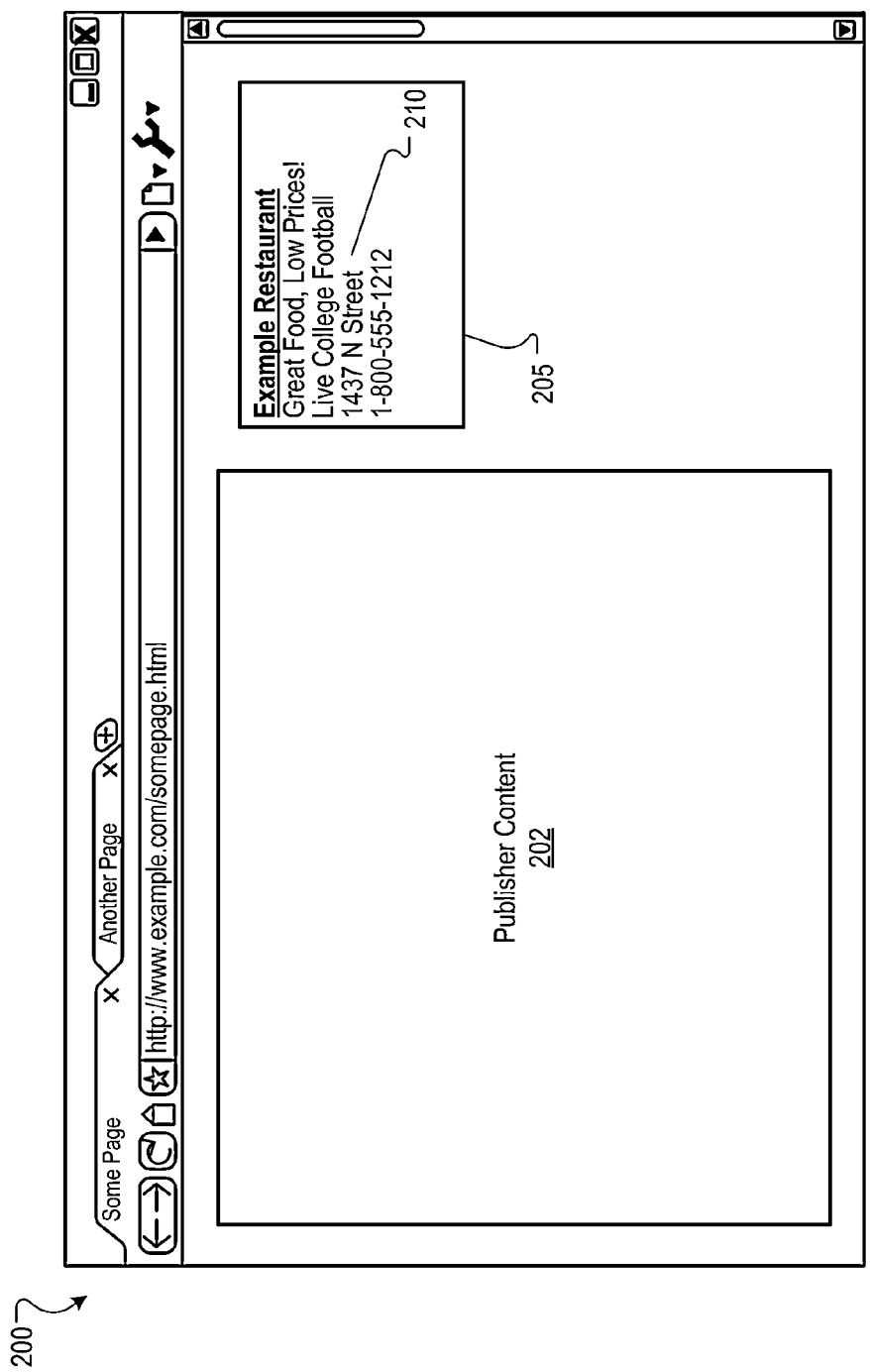
FIG. 2A depicts a browser displaying a sponsored content item.

FIG. 2A shows an example user interface 200 in which content (such as sponsored content or requested content, or both) is provided to a user device 106. For example, the resource can include specific publisher content 202 that is authored by the publisher. Additionally, resource includes a content item slot 205 in which a content item from a third party can be rendered. The content management and delivery system 110 can provide the third-party content item (e.g., advertisements, etc.) from a pool of available content items.

In some implementations, the one or more content items 210 that are selected can be selected by conducting an auction. The content items that are eligible to participate in the auction can be selected by various targeting criteria, such as interest profiles, the relevance of content items to the publisher content 202, to a time of the day, geographical location, keywords, to name a few examples.

Figure 2B:
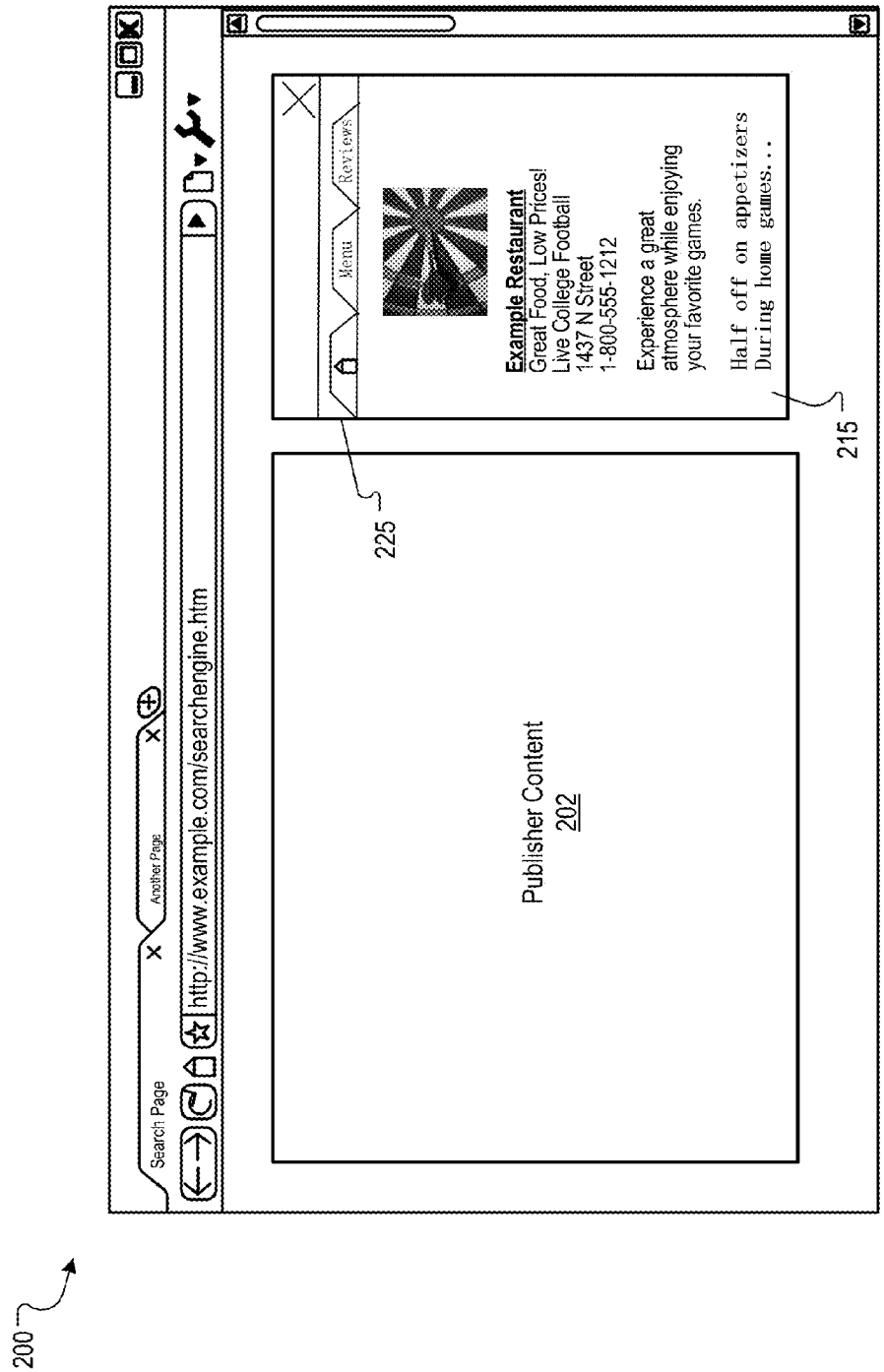
FIG. 2B depicts a browser displaying an expanded version of the sponsored content item.

In the case of expandable content items, an unexpanded version of the content item is initially rendered in the content item slot 205. When a user interacts with the content item 210 or with a trigger mechanism associated with the content item 210, the content item can be rendered in an expanded version. For example an expanded version 215 of the content item 210 is shown in the example of FIG. 2B. The expanded version 215 displays additional information. The expanded version 215 can include additional content, for example, images, larger text, audio, video, or web-based content. In one example, the content item 210 is presented first as an advertisement in textual format while enabling the user to expand the advertisement into a menu-driven, graphical advertisement in the expanded version 215. In some implementations, the action taken by the user to initiate launching the expanded version 215 can include selecting an expansion icon, selecting a marker on the side, below or above the content item, selecting or hovering a pointer over a particular portion of the content item, or, another form of user initiated and controlled action. The expanded content item 215 can also include a marker that the user can click or otherwise select such that the expanded content item 215 is replaced by the unexpanded content item 210.

The expansion and control of the content item 205 and the expanded content item 215 is facilitated, in part, by the publisher side file of the content sponsor 108 of the content item. In the case of advertisements served over an exchange, a content sponsor 108 is typically an advertiser that uses a vendor 109 for placing advertisements for advertisers through an exchange. The vendor 109 provides technology for creating and serving the advertisements.

Processing Requests Based on Publisher Side File Support for Expandable Content Items As described above, a publisher provides publisher side files for vendors they support. The publisher side file can be stored at a default location specified by the vendor, or at a non-default location specified by the publisher. In the examples described below, the publisher side files are stored at locations specified by the vendors, i.e., default locations.

The content management system 110, in some implementations, validates publisher side files for publisher that provide content item inventory to the content management system 110. The content management system 110 periodically checks each publisher 104 for the presence of publisher side files at specified publisher side file locations for the publisher 104. Based on this information, the content management system 110 filters out expandable content item requests for publishers using user device process of the first type, but that do not provide publisher side file support.

To illustrate, assume there are three vendors that serve expandable content items by use of the content management system 110, e.g., Vendor1, Vendor2, and Vendor3. Each vendor has a corresponding publisher side file, V1PSF.html, V2PSF.html, and V3PSF.html for the expandable content items it serves. Furthermore, each vendor specifies a particular default location specific to the vendor, e.g., Vendor1Path, Vendor2Path, and Vendor3Path.

Publisher X stores publisher side files for Vendor1 and Vendor 2. The default location portions of the URLs of publisher X are as shown in the publisher detail box 104-1, i.e., /Vendor1Path/V1PSF.html
/Vendor2Path/V2PSF.html Publisher Y stores publisher side files for Vendor2 and Vendor 3. The default location portions of the URLs of publisher Y are as shown in the publisher detail box 104-2, i.e., /Vendor2Path/V2PSF.html
/Vendor3Path/V3PSF.html The content management system 110 receives two example content item requests, one from publisher X and one from Publisher Y. The request processing sequences are denoted by the numerically coded flow callouts for each publisher. With respect to Publisher X, a user device 106-1 requests a resource from the publisher, as indicated by the flow callout 1X. The resource includes a content item slot in which sponsored content is to be displayed. Instructions in the resource cause the user device 106-1 to issue a content item request to the content management system 110, as indicated by the flow callout 2X.

The content management system 110 identifies, among the content items, expandable content items ECI1-ECI3, and content item CI4 eligible to fulfill the content item request. The content item CI4 is not expandable, e.g., it may a non-expanding text advertisement or a non-expanding image advertisement. The content items are selected, for example, based on targeting criteria and other factors.

The content management system 110 includes a selection filter 120 that determines whether the publisher specifies a user process of a first type for processing content items at the user device. In some implementations, the request from the user device 106-1 may include data indicating the user process type that will be used to process content items served in response to the request. For example, the request may specify that the content items are to be rendered in an iFrame that belongs to a domain that is different from the domain of the publisher 104. Thus, the selection filter 120 may use such data to determine whether the publisher 104 specifies a user process of the first type.

Often, however, the request will not include such data. Thus, in some implementations, the content management system 110 accesses publisher support data 112 that specifies, for each of multiple publishers 104, whether the publisher stores publisher side files for vendors 109, and whether the publisher specifies that expandable content items are to be processed according to a user process of a first type. Creation and maintenance of the publisher support data 112 is described with reference to FIG. 4 below.

For the request for publisher X, the selection filter determines that the publisher specifies a user process of the first type. Thus, the selection filter 120 determines a set of vendors for the publisher. The set of vendors is a subset of the vendors 109. Each vendor in the subset is a vendor for which the publisher provides a publisher side file for the vendor. For example, because the publisher X provides publisher side files for Vendor1 and Vendor2 and not for Vendor3, Vendor1 and Vendor2 are included in the subset, and Vendor3 is excluded from the subset.

The selection filter 120 then allows expandable content items served only by the set of second vendors to participate in the content item selection process 122. For example, as indicated by the strike-through text, the expandable content item ECI3 is excluded from the selection process. Accordingly, content items ECI1, ECI2 and CI4 are submitted to the selection process 122, as illustrated by flow callout 3.

The selection process 122 selects, for example, expandable content item ECI1 to fulfill the request. The selection is indicated by the bold font of ECI1. Content item data for the expandable content item ECI1 is then served to the user device 106-1, as indicated by the flow callout 4X.

Upon receiving the content item tag, the user device 106-1 can retrieve the required publisher side file from the host of Publisher X.

A similar result occurs for the processing of the content item request from the user device 106-2. Assume that for the content item request for the user device 106-2, the same four content items are determined to be eligible for the content item selection process 122. However, because publisher Y does not have a publisher side file for Vendor1, but does have a publisher side file for Vendor3, the selection filter 120 filters out the expandable content item ECI1.

The selection filter 120 can filter out all expandable content items for a request for a particular publisher if the particular publisher does not make available any publisher side files. For example, assume a user device issues a content item request for a content item to be rendered in an iFrame, and the publisher that provides the resource does not provide any publisher side files. In this situation, the selection filter 120 would filter out all expandable content items, and only non-expandable content items would be eligible for the selection process 122.

Conversely, the selection filter 120 can allow all expandable content items for a request for a particular publisher if the particular publisher does not specifying a user process of the first type. For example, assume a user device issues a content item request for a content item to be rendered in by a script within the resource provided by the publisher, and not within an iFrame. In this situation, the selection filter 120 allows expandable content item to participate in the selection process, as publisher side files are not necessary to properly process an expandable content item for this particular request.

Example Process Flows

Figure 3:
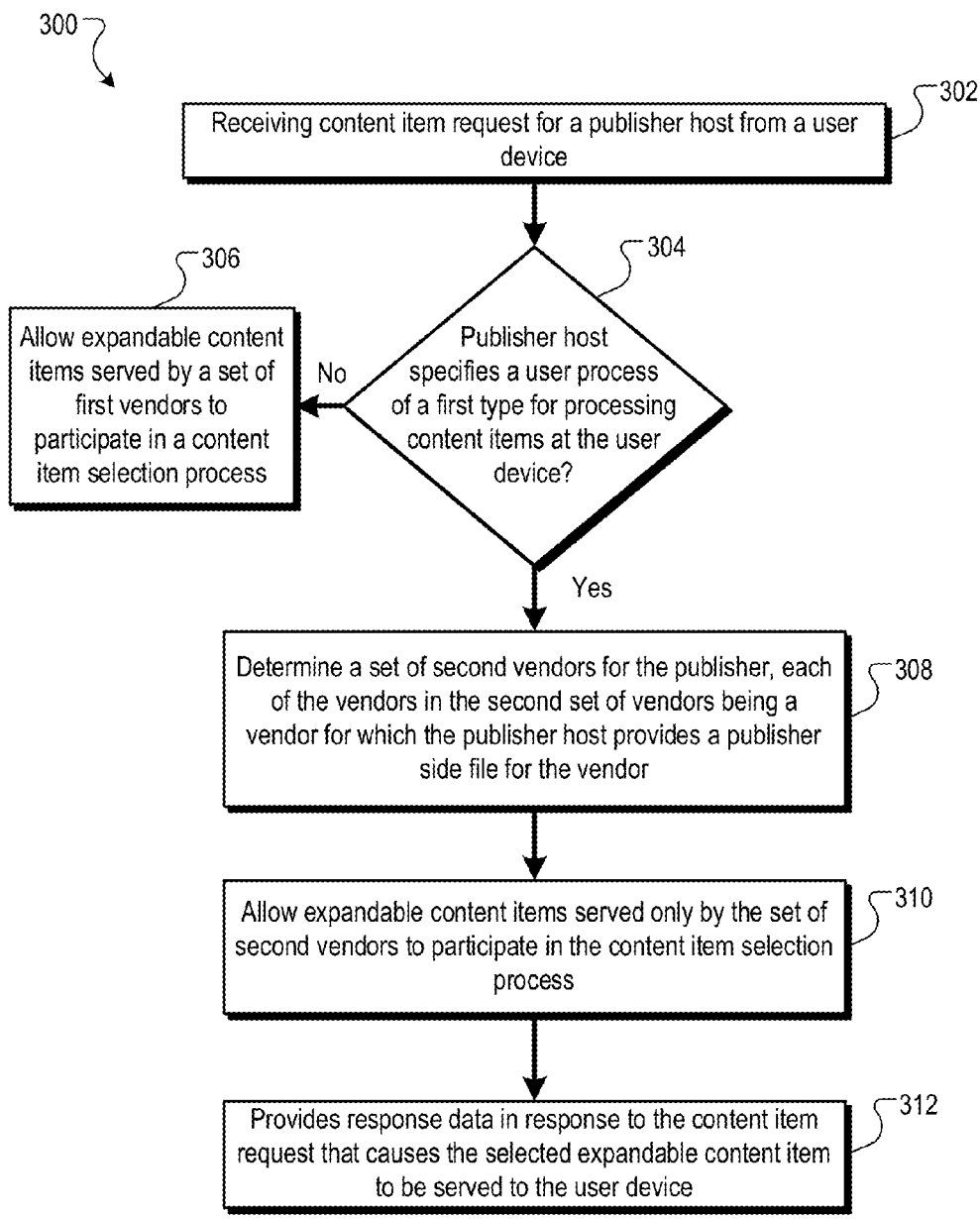
FIG. 3 is a flow diagram of an example process for filtering content items for a content item selection process based on a user process and vendor support.

FIG. 3 is a flow diagram of an example process 300 for filtering content items for a content item selection process based on a user process and vendor support. The process 300 can be implemented in a data processing apparatus of the content management system 110.

The content management system 110 receives a content item request for a publisher host from a user device (302). For example, a user device may request a resource from a host of a publisher 104. The resource 105 includes instructions that cause the user device 106 to send a content item request to the content management system 110.

The content management system 110 determines whether the publisher specifies a user process of a first type for processing content items at the user device (304). The determination can, in some implementations, be based on data specifying the user process type in the request. Alternatively, the content management system 110 accesses an association of publisher hosts and user process types stored in the publisher support data 112. The association specifies, for each publisher host, user process types specified by the publisher host.

If the publisher does not specify a user process of a first type for processing content items at the user device, then the content management system 110 allows expandable content items served by a set of first vendors to participate in a content item selection process to select a content item to fulfill the request (306). For example, if the content items are to be processed at the user device in a manner that does not require publisher side files, then expandable content items from all vendors can participate in the selection process.

If, however, the publisher does specify a user process of a first type for processing content items at the user device, then the content item manager 110 determines a set of second vendors for the publisher (308). Each of the second vendors is a vendor for which the publisher provides a publisher side file for the vendor. For example, with respect to FIG. 1, the set of second vendors for publisher X is Vendor1 and Vendor2; for publisher Y, Vendor2 and Vendor3.

The content management system 110 then allows expandable content items served only by the set of second vendors to participate in the content item selection process (310). For example, in some implementations, the publisher support data 112 also stores an association of publisher hosts and vendors that specifies, for each publisher that specifies a user process of the first type, vendors for which the publisher provides publisher side files. The content management system 110 accesses the publisher support data 112 to make this determination. For example, with respect to FIG. 1, the publisher support data 112 specifies that publisher X stores publisher side files for Vendor1 and Vendor2, and publisher Y stores publisher side files for Vendor2 and Vendor3. For the request for publisher X, the content management system allows only expandable content items from Vendor1 and Vendor2 to participate in the content item selection process 122.

Likewise, for the request for publisher Y, the content management system 110 allows only expandable content items from Vendor2 and Vendor3 to participate in the content item selection process 122.

The content management system 110 provides response data in response to the content item request that causes the selected expandable content item to be served to the user device (312). For example, the content management system 110 serves the advertisement to the user device.

Figure 4:
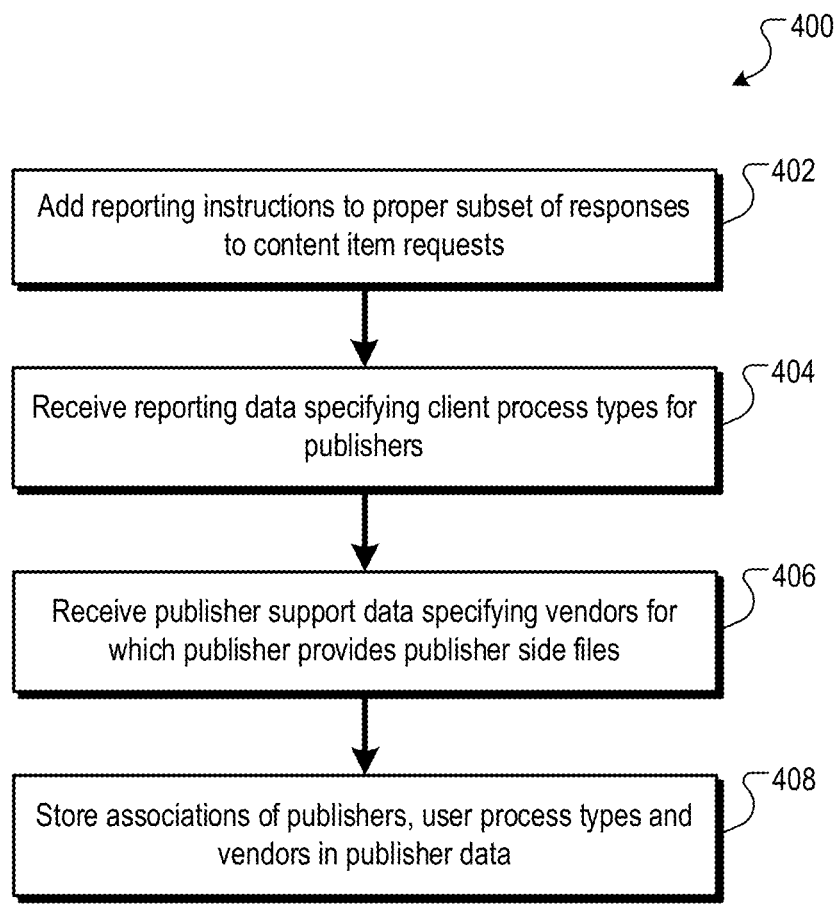
FIG. 4 is a flow diagram of an example process for collecting and storing publisher support data.
Figure 5:
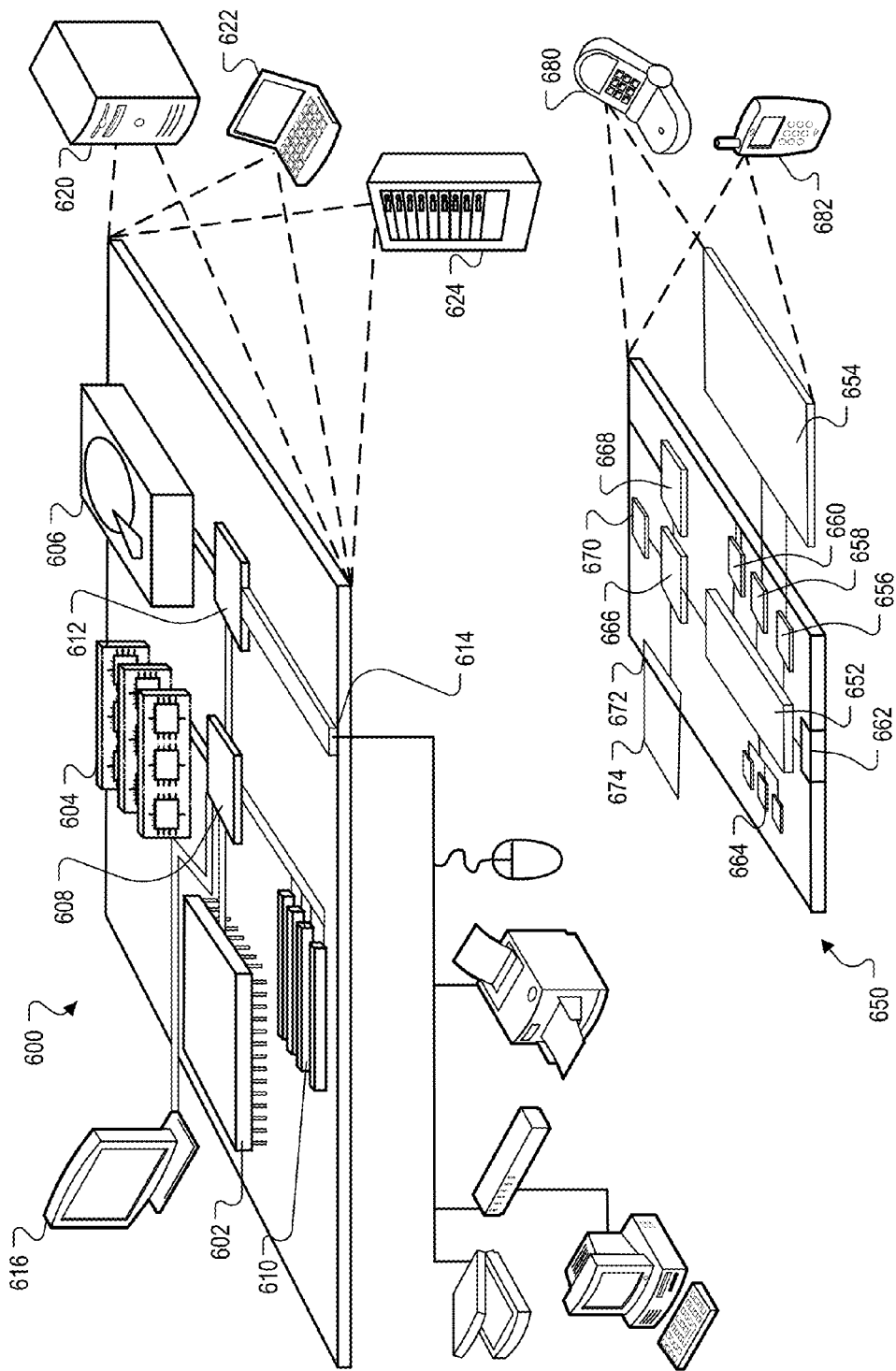
FIG. 5 is a block diagram of an example computer system that can be used to implement the methods, systems and processes described in this disclosure.

As described above, the content management system 110 may, in some implementations, store publisher support data 112 that specifies, for each of multiple publishers 104, whether the publisher stores publisher side files for vendors 109, and whether the publisher specifies that expandable content items are to be processed according to a user process of a first type. FIG. 4 is a flow diagram of an example process 400 for collecting and storing publisher support data 112. The process 400 can be implemented in a data processing apparatus of the content management system 110.

The content management system 110 adds reporting instructions to a proper subset of responses to content item requests (402). For example, for the content management system 110 may add instructions to a content time (or to a script that is provided process content items) that causes the user devices that execute the instructions to provide data that specifies the user process type used to process the content items. The instructions may be randomly added to a small percentage of response, e.g., 10% or less, for example.

The content management system 110 receives reporting data specifying a user process type specified by the publisher (404). For example, the user devices 106 may send reporting data specifying a publisher domain (or, alternatively, a publisher host), and for that publisher, whether the content item is rendered according to an iFrame tag or script tag.

For publishers that specify user processes of the first type, the content management system 110 receives publisher data specifying vendors for which the publisher provides publisher side files (406). The content management system 110 can receive this data in response to crawling the publisher web servers at known publisher side file locations (either as specified by the vendor or by the publisher) to obtain the publisher side file data, or by requesting data specifying publisher side files from the publishers.

The process stores associations of publisher hosts, user process types and vendors in the publisher support data (408). For example, the content item management system 110 determines, from the response data, user process types specified by each publisher, and stores in the association of publisher hosts and user process types the determined user processes types for each publisher. For each publisher that specifies a user process of a first type, data for the publisher that specifies the vendors that the publisher provides publisher side files is then stored in the publisher support data 112.

The process 400 may be performed continuously, with publisher sites being crawled regularly, and the reporting instructions being inserted into responses on an ongoing basis. Accordingly, the publisher support data 112 is kept current, thereby reducing the likelihood of serving an expandable content item that requires access to a publisher side file for a publisher that does not provide the necessary publisher side file.

Additional Implementation Details

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 600 is further intended to represent various typically non-mobile devices, such as televisions or other electronic devices with one or more processors embedded therein or attached thereto. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. A machine-readable medium or a computer-readable medium does not include a transitory signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, at an advertising exchange, advertisement requests for publisher hosts from user devices, each request specifying a publisher host, and for each request, wherein each advertisement served through an advertising exchange in response to the requests requires at the publisher host a publisher side file of a vendor for the advertisement, the publisher side file for the vendor being a file that facilitates processing of an expandable advertisement served by the vendor in a resource served by the publisher host, and wherein each publisher side file for a vendor corresponds to only the expandable content items the vendor serves;
accessing, by the advertising exchange, an association of publisher hosts and vendors that specifies, for each publisher host, vendors for which the publisher host provides publisher side files;
determining, by the advertising exchange, a set of vendors for the publisher host, each of the vendors being a vendor for which the publisher host provides a publisher side file for the vendor, and wherein the set of vendors excludes vendors for which the publisher does not provide a publisher side file;
enabling, by the advertising exchange, expandable advertisements served only by the set of vendors to participate in the advertisement selection process to select an advertisement to fulfill the request;
for each advertisement request:
receiving data indicating a selected expandable advertisement selected by the advertisement selection process; and
providing response data in response to the advertisement request that causes the selected expandable advertisement to be served to the user device.

2. The method of claim 1, wherein the advertisement selection process is an advertisement auction.

3. The method of claim 1, further comprising:
receiving, for each publisher host in the association of publisher hosts:
publisher support data specifying vendors for which the publisher host provides publisher side files; and
storing, in the association of publisher hosts and vendors, data specifying the vendors for which the publisher host provides publisher side files.

4. The method of claim 1, wherein the user process is an iFrame process that renders content items in an iFrame when rendering a resource served by a publisher host.

5. A system, comprising:
a data processing apparatus; and
a computer memory apparatus in data communication with the data processing apparatus and storing instructions executable by the data processing apparatus and that upon such execution cause the data processing apparatus to perform operations comprising:
receiving advertisement requests for publisher hosts from user devices, each request specifying a publisher host, and for each request, wherein each advertisement served through an advertising exchange in response to the requests requires at the publisher host a publisher side file of a vendor for the advertisement, the publisher side file for the vendor being a file that facilitates processing of an expandable advertisement served by the vendor in a resource served by the publisher host, and wherein each publisher side file for a vendor corresponds to only the expandable content items the vendor serves;

accessing an association of publisher hosts and vendors that specifies, for each publisher host, vendors for which the publisher host provides publisher side files;

determining, by the advertising exchange, a set of vendors for the publisher host, each of the vendors being a vendor for which the publisher host provides a publisher side file for the vendor, and wherein the set of vendors excludes vendors for which the publisher does not provide a publisher side file;

enabling expandable advertisements served only by the set of vendors to participate in the advertisement selection process to select an advertisement to fulfill the request;

for each advertisement request:
  receiving data indicating a selected expandable advertisement selected by the advertisement selection process; and
  providing response data in response to the advertisement request that causes the selected expandable advertisement to be served to the user device.

6. The system of claim 5, wherein the advertisement selection process is an advertisement auction.

7. The system of claim 6, the operations further comprising:
  receiving, for each publisher host in the association of publisher hosts:
    publisher support data specifying vendors for which the publisher host provides publisher side files; and
    storing, in the association of publisher hosts and vendors, data specifying the vendors for which the publisher host provides publisher side files.

8. The system of claim 6, wherein the user process is an iFrame process that renders content items in an iFrame when rendering a resource served by a publisher host.

9. A computer memory apparatus storing instructions executable by a data processing apparatus and that upon such execution cause the data processing apparatus to perform operations comprising:
  receiving advertisement requests for publisher hosts from user devices, each request specifying a publisher host, and for each request, wherein each advertisement served through an advertising exchange in response to the requests requires at the publisher host a publisher side file of a vendor for the advertisement, the publisher side file for the vendor being a file that facilitates processing of an expandable advertisement served by the vendor in a resource served by the publisher host, and wherein each publisher side file for a vendor corresponds to only the expandable content items the vendor serves;

accessing an association of publisher hosts and vendors that specifies, for each publisher host, vendors for which the publisher host provides publisher side files;

determining, by the advertising exchange, a set of vendors for the publisher host, each of the vendors being a vendor for which the publisher host provides a publisher side file for the vendor, and wherein the set of vendors excludes vendors for which the publisher does not provide a publisher side file;

enabling expandable advertisements served only by the set of vendors to participate in the advertisement selection process to select an advertisement to fulfill the request;

for each advertisement request:
  receiving data indicating a selected expandable advertisement selected by the advertisement selection process; and
  providing response data in response to the advertisement request that causes the selected expandable advertisement to be served to the user device.

10. The computer memory apparatus of claim 9, wherein the advertisement selection process is an advertisement auction.

11. The computer memory apparatus of claim 10, the operations further comprising:
  receiving, for each publisher host in the association of publisher hosts:
    publisher support data specifying vendors for which the publisher host provides publisher side files; and
    storing, in the association of publisher hosts and vendors, data specifying the vendors for which the publisher host provides publisher side files.

12. The computer memory apparatus of claim 10, wherein the user process is an iFrame process that renders content items in an iFrame when rendering a resource served by a publisher host.

* * * * *